(12) United States Patent
Mulcay

(10) Patent No.: US 8,078,109 B1
(45) Date of Patent: Dec. 13, 2011

(54) CONCURRENTLY COORDINATED MICROWAVE PATHS IN COORDINATED FREQUENCY BANDS

(75) Inventor: Michael Mulcay, Carmel Valley, CA (US)

(73) Assignee: Wireless Stategies, Inc., Hagerstown, MD (US)

( * ) Notice: Subject to any disclaimer, the term of this patent is extended or adjusted under 35 U.S.C. 154(b) by 846 days.

(21) Appl. No.: 12/102,766

(22) Filed: Apr. 14, 2008

Related U.S. Application Data (60) Provisional application No. 60/923,229, filed on Apr. 13, 2007.

(51) Int. Cl.
*H04B 1/00* (2006.01)
*H04B 15/00* (2006.01)

(52) U.S. Cl. ............ 455/63.1; 455/445; 455/562.1; 455/503; 455/456.4; 455/67.15; 455/114.2; 455/454; 370/354; 370/312; 370/322; 370/280

(58) Field of Classification Search ............ 455/63.1, 455/445–449, 454, 67.15, 456.4, 114.2, 503, 455/562.1; 370/322, 354, 280, 312
See application file for complete search history.

(56) References Cited

U.S. PATENT DOCUMENTS

| | | | |
|---|---|---|---|
| 4,659,878 A | 4/1987 | Dinkins | |
| 4,736,454 A | 4/1988 | Hirsch | |
| 4,914,651 A | 4/1990 | Lusignam | |
| 4,965,850 A | 10/1990 | Schloemer | |
| 5,109,529 A | 4/1992 | Akaiwa | |
| 5,134,709 A | 7/1992 | Bi et al. | |
| 5,263,176 A | 11/1993 | Kojima et al. | |
| 5,497,503 A * | 3/1996 | Rydberg et al. | 455/454 |
| 2004/0162115 A1* | 8/2004 | Smith et al. | 455/562.1 |
| 2004/0259556 A1* | 12/2004 | Czys | 455/447 |

OTHER PUBLICATIONS

U.S. Appl. No. 11/674,621, filed Feb. 13, 2007, "Uncoordinated Microwave Paths in Coordinated Frequency Bands".

* cited by examiner

*Primary Examiner* — Marceau Milord
(74) *Attorney, Agent, or Firm* — Fish & Richardson P.C.

(57) ABSTRACT

Methods, systems, and apparatus, for operation of concurrently coordinated microwave paths in coordinated frequency bands are described. In one aspect, a system includes a plurality of primary sites, each primary site including a transceiver portion configured to transmit to or receive from the transceiver portion of another primary site on a coordinated microwave path on a first frequency; a secondary site, the secondary site located in an optimized area, the secondary site including a transceiver portion, the transceiver portion of the secondary site configured to transmit to the transceiver portion of a primary site on a concurrently coordinated microwave path on the first frequency, where the optimized area is an area where interference caused by the secondary site to other transceivers that operate on a different coordinated microwave path on the first frequency is less than interference caused by a primary site to the other transceivers.

9 Claims, 7 Drawing Sheets

CONCURRENTLY COORDINATED MICROWAVE PATHS IN COORDINATED FREQUENCY BANDS

RELATED APPLICATION

This application claims the benefit of the filing date of U.S. Provisional Application No. 60/923,229, which was filed on Apr. 13, 2007. The contents of U.S. Provisional Application No. 60/923,229 are incorporated by reference in their entirety.

TECHNICAL FIELD

This invention relates to operation of concurrently coordinated microwave paths in coordinated frequency bands.

BACKGROUND

The operation of microwave communications paths is regulated by governments, international bodies, and treaties. In the United States, use of microwave frequencies for communications is authorized for non-exclusive uncoordinated use and exclusive coordinated use. An example of uncoordinated use is Wireless Local Area Networks (WLANs) (e.g., operation in the Industrial Scientific and Medical (ISM) and Unlicensed National Information Infrastructure (UNII) bands operating under the Code of Federal Regulations (C.F.R.), Title 47, Part 15 (2002), often using IEEE 802.11 standards), where users are subject to interference from other users communicating on the same portion of the microwave spectrum. An example of exclusive coordinated use is fixed Point-To-Point (PTP) licensed systems (e.g., systems where the connection is strictly between two endpoints) operated for backhauling large data traffic between distributed sites and more centralized sites under 47 C.F.R. §101. For example, frequency bands between 3.7 GHz to 11.7 GHz (e.g., 3.7 GHz to 4.2 GHz, 5.9 GHz to 6.4 GHz, and 10.7 GHz to 11.7 GHz) can be used for fixed PTP licensed systems in the United States.

In the United States, exclusive use mobile, Point-To-Multi-Point (PTMP), and PTP systems generally cannot operate in the same Exclusive Use Area (EUA) on the same frequency(s) as other exclusive use systems. For example, mobile and PTMP EUAs are typically defined by demographics such as a Standard Metropolitan Statistical Area (SMSA). Typically, only one system is allowed to transmit and receive on given frequency(s) in the EUA. Furthermore, an applicant for an exclusive fixed PTP license, for example from the Federal Communications Commission (FCC) or the National Telecommunications and Information Administration (NTIA), engineers the system, by appropriate studies, analyses, and selection of sites, transmitters, antennas, and frequencies to avoid interference in excess of permissible levels to other users in an EUA. Conventionally, fixed PTP systems on a coordinated microwave path operate in Frequency Division Duplex (FDD) mode, requiring two frequencies (e.g., one frequency for transmission in each direction between the two endpoint sites). For a fixed PTP path, the EUA boundary for the two frequencies is typically 125 miles from the antenna of a site, except for the antenna main lobe (about ±5 degrees), where the distance to the EUA boundary is typically 250 miles.

Generally, the prospective user of a proposed microwave path conducts both a site survey and a coordination study. The site survey includes verifying that there is a Line-Of-Site (LOS) path between the proposed endpoint sites and that the proposed sites can support the antennas. For example, the antenna support structure typically needs to withstand winds up to 125 mph. A coordination study is an analysis to identify any potential interference issues between the proposed sites and existing sites in the proposed EUA.

The proposed path applicant needs to conduct a prior coordination study, in accordance with government regulations, to ensure that the Equivalent Isotropic Radiated Power (EIRP) from the proposed path will not cause harmful interference (e.g., interference above a particular level) to other users operating on existing microwave paths on the proposed frequency pair in the proposed path's EUA. An operator of a successfully prior coordinated microwave path can receive a license to operate by a regulatory agency, e.g., the FCC. Once a proposed path is successfully prior coordinated and licensed, thereby becoming an existing path, it is the responsibility of the next proposed path applicant to ensure that a new proposed path does not cause harmful interference to the existing paths in the EUA.

If a proposed path applicant is unable, after conducting a prior coordination study, to prior coordinate a microwave path in an EUA for a particular frequency pair, the applicant may seek to prior coordinate the proposed path on a different frequency pair. However, this may not be possible, because the amount of spectrum in any given geographical area is finite. If it is possible, the path applicant performs a second, costly and time-consuming coordination study, issue a Prior Coordination Notice to all operators within the EUA, wait thirty days for any comments, and, if no adverse comments are received, wait for approval after regulatory filings. Additionally, if the proposed path applicant seeks to use an existing coordinated path site as one of the sites for the proposed path, an additional antenna and transceiver would be needed at the existing site to operate on the new frequency pair.

A conventional way to increase spectral efficiency is to minimize the area in which harmful interference is produced. This may require minimizing the angle of the antenna radiation pattern main lobe and maximizing suppression of the antenna radiation pattern side lobes and back lobe. Typically, achieving narrow beam widths requires physically large, unsightly antennas, which can be expensive and can require substantial mounting structures to withstand high wind loading.

SUMMARY

In general, one aspect of the subject matter described in this specification can be embodied in a system that includes a first site, the first site including a transceiver portion; a second site, the second site including a transceiver portion, the transceiver portion of the second site configured to receive from the transceiver portion of the first site on a coordinated microwave path on a first frequency; a third site, the third site including a transceiver portion, the transceiver portion of the third site configured to transmit to the transceiver portion of the second site on a coordinated microwave path on the first frequency; and a fourth site, the fourth site located in an optimized area; the fourth site including a transceiver portion, the transceiver portion of the fourth site configured to transmit to the transceiver portion of the first site or the second site on a concurrently coordinated microwave path on the first frequency; and interference caused by the fourth site to other transceivers that operate on a different coordinated microwave path on the first frequency is less than interference caused by the third site to the other transceivers. Other embodiments of this aspect include corresponding methods, apparatus, and computer program products.

These and other embodiments can optionally include one or more of the following features. The transceiver portion of the third site is configured to use time division multiplexing to transmit and receive on the first frequency and a second frequency.

In general, another aspect of the subject matter described in this specification can be embodied in a system that includes a plurality of primary sites, each primary site including a transceiver portion configured to transmit to or receive from the transceiver portion of another primary site on a coordinated microwave path on a first frequency; a secondary site, the secondary site located in an optimized area, the secondary site including a transceiver portion, the transceiver portion of the secondary site configured to transmit to the transceiver portion of a primary site on a concurrently coordinated microwave path on the first frequency, where the optimized area is an area where interference caused by the secondary site to other transceivers that operate on a different coordinated microwave path on the first frequency is less than interference caused by a primary site to the other transceivers.

In general, another aspect of the subject matter described in this specification can be embodied in a method that includes in an optimized area, transmitting on a concurrently coordinated microwave path from a transceiver portion of a first site to a transceiver portion of a second site or a third site on a first frequency, the second site including a transceiver portion, a transceiver portion of the third site configured to receive from the transceiver portion of the second site on a coordinated microwave path on the first frequency, where interference caused by the first site to other transceivers that operate on a different coordinated microwave path on the first frequency is less than interference caused by a fourth site to the other transceivers, where a transceiver portion of the fourth site and the transceiver portion of the third site are configured to transmit on a coordinated microwave path on the first frequency.

In general, another aspect of the subject matter described in this specification can be embodied in a method that includes in an optimized area, transmitting on a concurrently coordinated microwave path from a transceiver portion of a first site or a second site to a transceiver portion of a third site on a first frequency, the second site including a transceiver portion, a transceiver portion of the second site configured to receive from the transceiver portion of the first site on a coordinated microwave path on the first frequency, where interference caused by the third site to other transceivers that operate on a different coordinated microwave path on the first frequency is less than interference caused by a fourth site to the other transceivers, where a transceiver portion of the fourth site and the transceiver portion of the second site are configured to transmit on a coordinated microwave path on the first frequency.

In general, another aspect of the subject matter described in this specification can be embodied in a method that includes for an optimized area, a transceiver portion of a first site configured to transmit on a concurrently coordinated microwave path to a second site or a third site on a first frequency, the second site including a transceiver portion, a transceiver portion of the third site configured to receive from the transceiver portion of the second site on a coordinated microwave path on the first frequency; determining a configuration for a fourth site, where interference caused by the first site to other transceivers that operate on a different coordinated microwave path on the first frequency is less than interference caused by the fourth site to the other transceivers.

Implementations of this aspect can optionally include one or more of the following features. Determining a configuration for the fourth site includes selecting settings for one or more parameters of the fourth site, the parameters including the location for an antenna, the orientation of the antenna, the gain of the antenna, or the power of the transceiver portion; estimating the interference from the transceiver portion of the fourth site to a transceiver portion of one or more sites that operate on a different coordinated microwave path on the first frequency; and estimating the interference from the transceiver portion of the first site to the transceiver portion of the one or more sites. The one or more sites are existing sites. The one or more sites are modeled future sites. The interference is calculated according to the expression: $TrxEIRP + AFrx - 96.6 - 20\log(Fo) - 20\log(D)$, where: $TrxEIRP$=Equivalent Isotropic Radiated Power of the transceiver portion of a site in dBm; $AFrx$=antenna gain of another site that operates on a different coordinated microwave path at an angle directly towards the transceiver portion of the site in dBi; $Fo$=frequency of operation in GHz; and $D$=distance, in miles, between the sites.

In general, another aspect of the subject matter described in this specification can be embodied in a first site that includes a transceiver portion configured to transmit or receive from a transceiver portion of a second site on a coordinated microwave path on a first frequency, the transceiver portion of the second site and a transceiver portion of a third site configured to transmit on a coordinated microwave path on the first frequency, a fourth site located in an optimized area where interference caused by the fourth site to other transceivers that operate on a different coordinated microwave path on the first frequency is less than interference caused by the first site to the other transceivers, the fourth site configured to transmit to the second site or the third site on a concurrently coordinated microwave path on the first frequency.

In general, another aspect of the subject matter described in this specification can be embodied in a first site that includes a transceiver portion configured to transmit to a transceiver portion of a second site or a third site on a concurrently coordinated microwave path on a first frequency, the transceiver portion of the second site configured to transmit to or receive from the transceiver portion of the third site on a coordinated microwave path on the first frequency, a transceiver portion of the third site and a transceiver portion of a fourth site configured to transmit on a coordinated microwave path on the first frequency, the first site located in an optimized area where interference caused by the first site to other transceivers that operate on a different coordinated microwave path on the first frequency is less than interference caused by the fourth site to the other transceivers.

Particular embodiments of the subject matter described in this specification can be implemented to realize one or more of the following advantages. The antennas for the secondary sites can be inexpensive, unobtrusive, and physically small with reduced wind loading requirements. Removing the need to perform additional site surveys for secondary sites reduces costs and shortens service lead times. Deploying secondary sites does not require additional prior coordination studies and analysis, reducing costs and the number of regulatory filings necessary. Frequency reuse with statistical traffic loading increases spectral efficiency, as measured in bits per second per Hertz per subscriber. In addition to the PTP application of the spectrum, the spectrum can be used to provide Point-To-Multipoint (PTMP) services, e.g., backhaul, and mobile services without using additional spectrum and without causing harmful interference to existing or future microwave paths. Secondary sites can be deployed around existing and new coordinated path sites. The possibility that a secondary site will cause harmful interference to a foreign site can be decreased or eliminated. Coordinated path sites using Time Division Duplex-Frequency Division Duplex (TDD-FDD) reversed paired frequencies can transmit data at rates significantly above the data rates of coordinated path sites using conventional FDD, and the area around the path where secondary sites can be safely deployed can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Conventionally, for a fixed PTP system operating on a coordinated microwave path, two endpoint sites (e.g., base stations) communicate in FDD mode over a frequency pair. Each site includes a transceiver and an antenna. In FDD mode, the site transceiver is configured to transmit only on one frequency and receive only on the other frequency. For example, for Sites A and B operating on frequency pair F1 and F2, Site A transmits to Site B on F1 and Site B transmits to Site A on F2.

Figure 1:
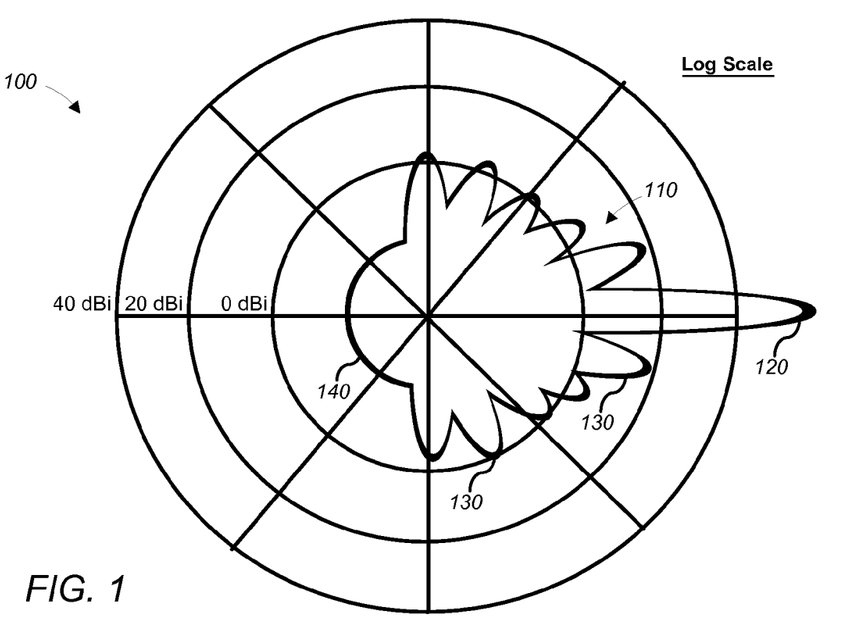
FIG. 1 illustrates a logarithmic scale polar plot of the radiation pattern of a microwave directional antenna.

Typically, the antenna for a fixed site in a PTP system is a directional antenna (e.g., an antenna which radiates higher power in one direction). Referring to FIG. 1, the radiation pattern 110 of a microwave directional antenna can be illustrated with a polar plot 100 using a logarithmic scale. The contours of the polar plot 100 correspond to the antenna gain in dBi, e.g., decibels over the gain of an ideal isotropic radiator. A plot of the radiation pattern shows the antenna gain as a function of angle or direction. The radiation pattern 110 includes a main lobe 120, one or more side lobes 130, and a back lobe 140.

The main lobe 120 illustrates the beamwidth of maximum antenna gain. Typically, for directional antennas in a PTP system, the beamwidth is within ±3 degrees. The angle of the back lobe 140 is typically from about 100 to 260 degrees. In a PTP system, the main lobe of a site antenna is pointed towards the other site of the link. The side lobes 130 and the back lobe 140 have a suppressed gain relative to the main lobe. For example, in the radiation pattern of FIG. 1, the main lobe 120 has a gain that is greater than 40 dBi, the side lobes 130 have gain levels that are less than 20 dBi, and the back lobe 140 has a gain of approximately −10 dBi. A directional antenna with a narrow beamwidth and suppressed side and back lobes is preferred in order to minimize the creation of interference to other receivers and to minimize the interference received from other sites. This may require an antenna which is expensive, unsightly, and large, requiring substantial mounting structures to withstand high wind loading.

Figure 2:
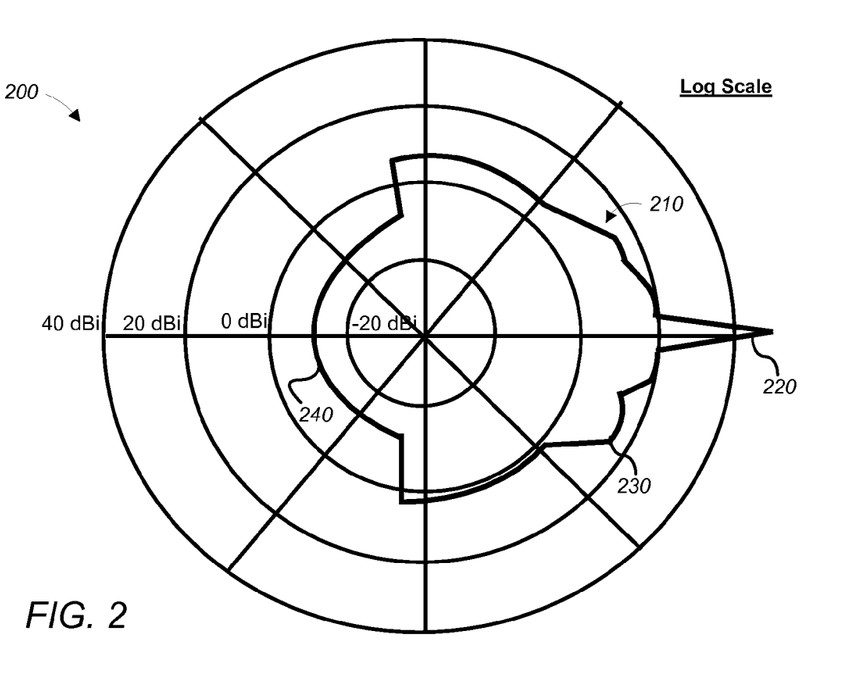
FIG. 2 illustrates a logarithmic scale polar plot of the radiation pattern envelope (RPE) for a microwave directional antenna.

In the United States, the FCC requires operators of fixed PTP sites on coordinated microwave paths to only use antennas which meet or exceed a specified Radiation Pattern Envelope (RPE). Referring to FIG. 2, an RPE 210 for a microwave directional antenna can be illustrated with a polar plot 200 using a logarithmic scale. The length of a vector from the center of the plot to the RPE contour corresponds to the antenna gain in dBi in the direction of the vector. The FCC regulations specify the maximum gain of the back lobe and side lobes, relative to the main lobe, that a microwave directional antenna can have. The RPE 210 has a contour line showing the maximum gain allowed for the main lobe 220, the side lobe region 230, and the back lobe 240. A proposed path applicant wishing to prior coordinate a microwave path must demonstrate that the antenna of the proposed site will have a radiation pattern that meets or exceeds the regulation-specified RPE. That is, the radiation pattern (e.g., the radiation pattern 110 of FIG. 1) of the proposed antenna must be within the contours of the RPE 210.

Figure 3:
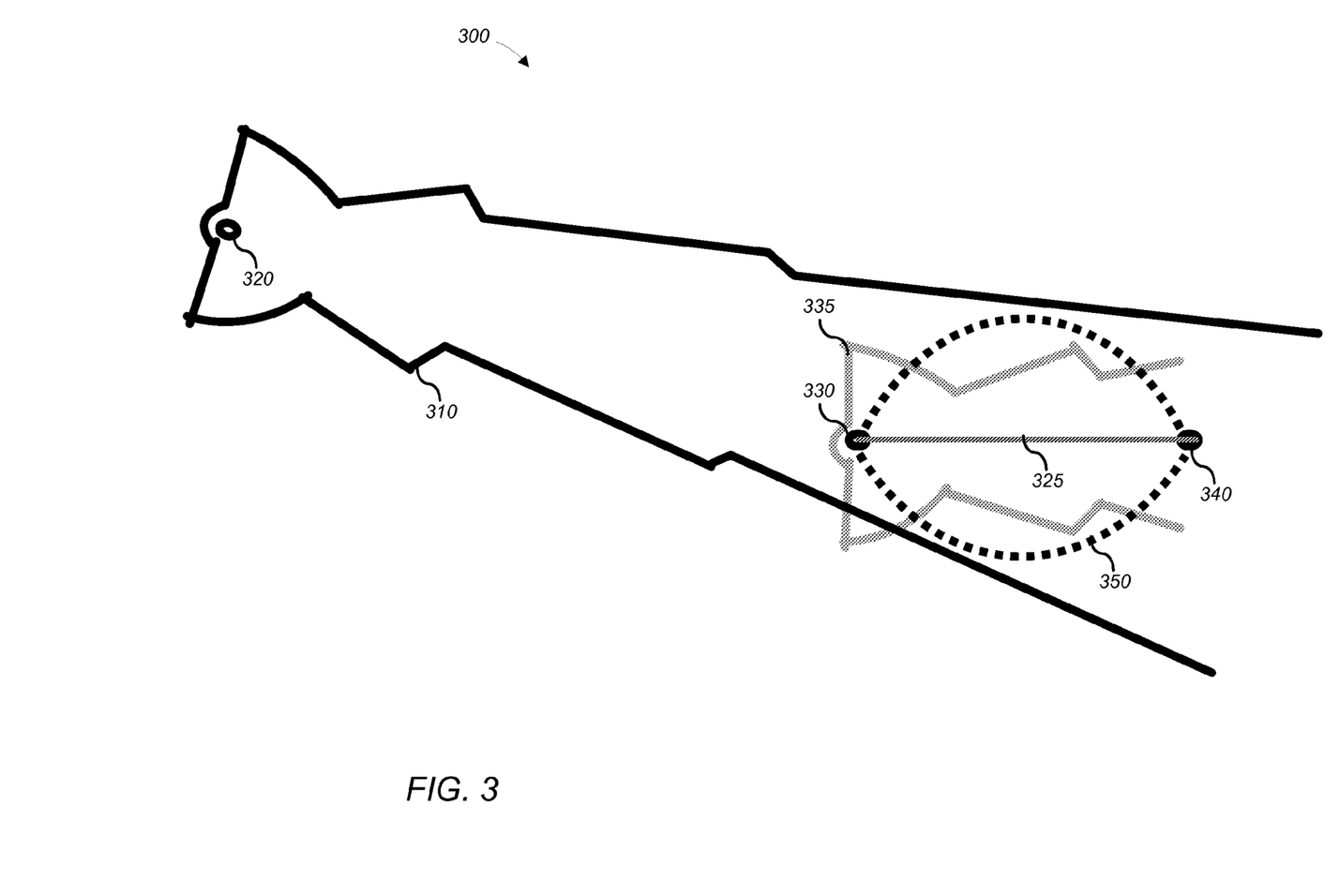
FIG. 3 illustrates a linear scale plot of an interference contour of a primary site overlapping a primary path.

FIG. 3 illustrates a linear scale plot 300 of an interference contour 310 of a primary site (e.g., Site C 320) overlapping a primary path 325. The linear scale plot includes Site A 330, Site B 340, and Site C 320. Each primary site can include a transmitter and a receiver. The linear scale plot also includes a coordinated path (e.g., primary path 325) between Site A 330 and Site B 340.

Secondary sites (not shown) can be deployed around the primary sites. Each secondary site includes a transmitter and a receiver to transmit to and receive from the primary site on concurrently coordinated microwave paths. The sites are named secondary sites, because they operate within an interference contour of a primary site and must accept interference accepted by a primary site.

Upon deployment of paired sites for a PTP system (e.g., Site A 330 and Site B 340) on a prior coordinated microwave path (e.g., primary path 325), a transmitting site can have interference contours (e.g., interference contour 335 of Site A 330) that define regions of harmful interference. In the United States, regulation 47 C.F.R. §101.3 defines harmful interference as "interference that endangers the functioning of a radionavigation service or of other safety services or seriously degrades, obstructs or repeatedly interrupts a radiocommunication service operating in accordance with these regulations." The FCC regulations referred to in this application are to be understood as the regulations in place on the filing date of the application.

An interference contour (e.g., interference contours 310 and 335) is a line through the points around a primary site where, for a constant foreign receiver antenna gain, a foreign receiver would first receive harmful interference. Thus, the interference contour is a boundary of an area around a primary site within which, for a constant receiver antenna gain, a foreign receiver would experience harmful interference. The interference, and therefore the interference contours, are functions of equipment and propagation parameters of a transmitter and a receiver (e.g., the orientation of a receiving antenna).

The interference, IFrxTrx, from the transceiver (e.g., transmitter portion of the transceiver) of a proposed site received at a transceiver (e.g., receiver portion of the transceiver) of a receiving site can be calculated using the following equation:

$$IFrxTrx = TrxEIRP + AFrx - 96.6 \text{ dB} - 20 \log(Fo) - 20 \log(D) \quad \text{(Eqn. 1)}$$

In Eqn. 1, TrxEIRP is the EIRP of the transceiver of the proposed site transmitting directly towards the transceiver of the receiving site in dBm (power in decibels relative to one milliwatt). AFrx is the antenna gain, in dBi, of the receiving site at an angle directly towards the transceiver of the proposed site. Fo is the operating frequency in gigahertz (GHz), and D is the distance, in miles, between the proposed site and the receiving site. IFrxTrx is measured in dBm. The frequency term, the distance term, and the constant (96.6 dB) in Eqn. 1 represent the free space loss (e.g., path loss) of the transmission. The TrxEIRP can be calculated using the proposed site transceiver power, the antenna gain, and the antenna radiation suppression (e.g., for back lobe and side lobes) as a function of angle.

The distance from a primary site transceiver to an interference contour (DIC) can be calculated by modeling a system where the antenna of a hypothetical site is located directly on the interference contour. DIC, as measured in miles, can be calculated by using the following equation:

$$DIC = \text{antilog } [TrxEIRP + AFrx - ITFrx - 96.6 \text{ dB} - 20 \log(Fo)]/20 \quad \text{(Eqn. 2)}$$

In Eqn. 2, ITFrx is the interference threshold (e.g., the interference level that causes the receiver sensitivity at a bit error rate (BER) of $10^{-6}$ to be reduced by 1 dB) of the hypothetical site in dBM.

Because DIC, depends on the antenna gain of the transceiver of the receiving site at an angle directly towards the transceiver of the proposed site, the interference contour can vary, for example, according to which antenna lobe transmits from the transmitting site to which antenna lobe of the receiving site. For example, minimum distances from a primary site to the interference contour occurs when the receiving site has its antenna back lobe pointed at the primary site. In this example, the interference contour can be called a receiver back lobe interference contour of the primary site. As another example, when the receiving site has its side lobe pointed at the primary site, the distance from the primary site to the interference contour increases (e.g., the area of interference increases). In this example, the interference contour can be called a receiver side lobe interference contour of the primary site.

In a FDD operating mode, a proposed foreign site could successfully prior coordinate with its antenna back lobe pointed towards a primary site while its main lobe is pointed towards a secondary site operating within a back lobe interference contour of the primary site. Returning to FIG. 3, the area between the foreign receiver back lobe interference contour 335 and a contour 350 (indicated by a dotted line) represents locations where this condition could exist. The portions of the contour 350 outside of the foreign receiver back lobe interference contour 335 indicate locations where a particular foreign site can operate with its back lobe pointed at Site A 330 and with its main lobe pointed at secondary sites operating between Site A 330 and Site B 340, if Site C 320 did not exist.

The contour 350 is determined by characteristics of the antenna at the foreign site. For example, the FCC specification for a Category A antenna would result in a minimum included angle at the foreign site of 110 degrees. The foreign site's antenna with its main lobe at an angle of 110 degrees away from the angle towards Site A 330 could point directly at secondary sites located within the foreign receiver back lobe interference contour 335 from the midpoint of the primary path 325 to Site B 340.

However, secondary sites can operate without causing harmful interference to a foreign site if the interference signal at the input of the foreign site from a primary site (IFrxPte) is greater than the interference signal at the foreign site from the secondary site (IFrxSte). Rewriting the generic interference equation of Eqn. 1, IFrxPte and IFrxSte can be represented by the following equations:

$$IFrxSte = SteEIRP + AFrx - 96.6 - 20 \log(Fo) - 20 \log(D) \quad \text{(Eqn. 3)}$$

$$IFrxPte = PteEIRP + AFrx - 96.6 - 20 \log(Fo) - 20 \log(D) \quad \text{(Eqn. 4)}$$

In Eqn. 3, SteEIRP and PteEIRP are the EIRP of the transceiver of the secondary site and primary site, respectively, transmitting directly towards the transceiver of the foreign site in dBm. AFrx is the antenna gain, in dBi, of the foreign site at an angle directly towards the transceiver of the secondary site of Eqn. 3, or of the primary site in Eqn. 4. Fo is the operating frequency in gigahertz (GHz), and D is the distance, in miles, between the foreign site and the secondary site of Eqn. 3, or the primary site in Eqn. 4. IFrxSte and IFrxPte are measured in dBm. The frequency term, the distance term, and the constant (96.6 dB) in Eqns. 3 and 4 represent the free space loss (e.g., path loss) of the transmission. The SteEIRP (or PteEIRP) can be calculated using the secondary (or primary) site transceiver power, the antenna gain, and the antenna radiation suppression (e.g., for back lobe and side lobes) as a function of angle.

A foreign site at a location where the foreign site does not cause harmful interference to primary sites of a licensed path must accept interference from the primary sites. If interference from secondary sites of the licensed paths is maintained at a level less than the interference from the primary sites, the secondary sites will not cause harmful interference to the primary sites. Therefore, the microwave paths that secondary sites operate on can be considered concurrently coordinated microwave paths because the paths are coordinated concurrently with primary paths when the prior coordination condition of IFrxPte>IFrxSte is satisfied.

The signal levels from the secondary sites can be adjusted to maintain the prior coordination condition of IFrxPte>IFrxSte. Equipment and propagation parameters of the foreign site may be required to maintain this condition. When considering foreign sites, sites at both ends of a link must be considered. Parameters include: transmitting/receiving station coordinates, effective isotropic radiated power and type of modulation of transmitting equipment, gain and radiation pattern of transmitting/receiving antenna(s), and transmitting/receiving antenna center line height(s) above ground level and ground elevation above mean sea level. For example, a network, or smart antenna system, can use these parameters to adjust the EIRPs of the secondary sites to meet the prior coordination condition IFrxPte>IFrxSte. However, there can be a high probability that a foreign site will be proposed that prior coordinates with the primary site, requiring the secondary sites EIRP to be reduced to an unacceptable level.

An optimized area around a coordinated path (e.g., primary path 325) can be defined such that foreign sites cannot be located in the optimized area without causing or being subjected to unacceptable interference. The term "optimized"

does not imply that the area is optimized for a particular characteristic; "optimized" is used as a description that within the area, the condition IFrxPte>IFrxSte is satisfied. Therefore, no existing foreign receivers are present in the optimized area; no proposed foreign receivers can operate without being subjected to harmful interference from a primary site or causing harmful interference to the existing path's transceiver; a foreign receiver located at or beyond the optimized area cannot have its antenna side lobes or main lobe pointed at a secondary site without having its side lobes or main lobe pointed at a primary site; and secondary sites deployed within the optimized area do not interfere with any existing or proposed foreign receivers that are outside of the optimized area that are not subjected to interference by a primary site.

The optimized area can be determined using equipment and propagation parameters similar to the parameters described previously. In some implementations, the optimized area can be initially calculated using free space propagation. If free space propagation does not exist, or if a meaningful parameter should change the free space propagation profile (e.g., construction of a new building), then the optimized area can be adjusted according to the changed parameter(s). Furthermore, the shape of the optimized area is determined by the shape of the primary antennas RPE and/or the EUA boundary and the distance between the primary sites. The size of the optimized area is determined by the factors given in the DIC equation.

In some implementations, a new path is prior coordinated so that an interference contour overlaps the primary path. The interference contours (e.g., foreign receiver back lobe interference contour) of the new path can define the optimized area. Secondary sites deployed within the optimized area can operate without causing harmful interference to foreign sites. For example, a transmitter located at Site C 320, that transmits on the same frequency as Site A 330, creates an interference contour 310 of Site C 320. The interference contour 310 of Site C 320 overlaps the primary path 325 and the contour 350 where foreign sites can be located. Site C 330 can be configured so that its interference contours prevent foreign sites from being located in the area between the back lobe interference contour 335 and contour 350.

Figure 4:
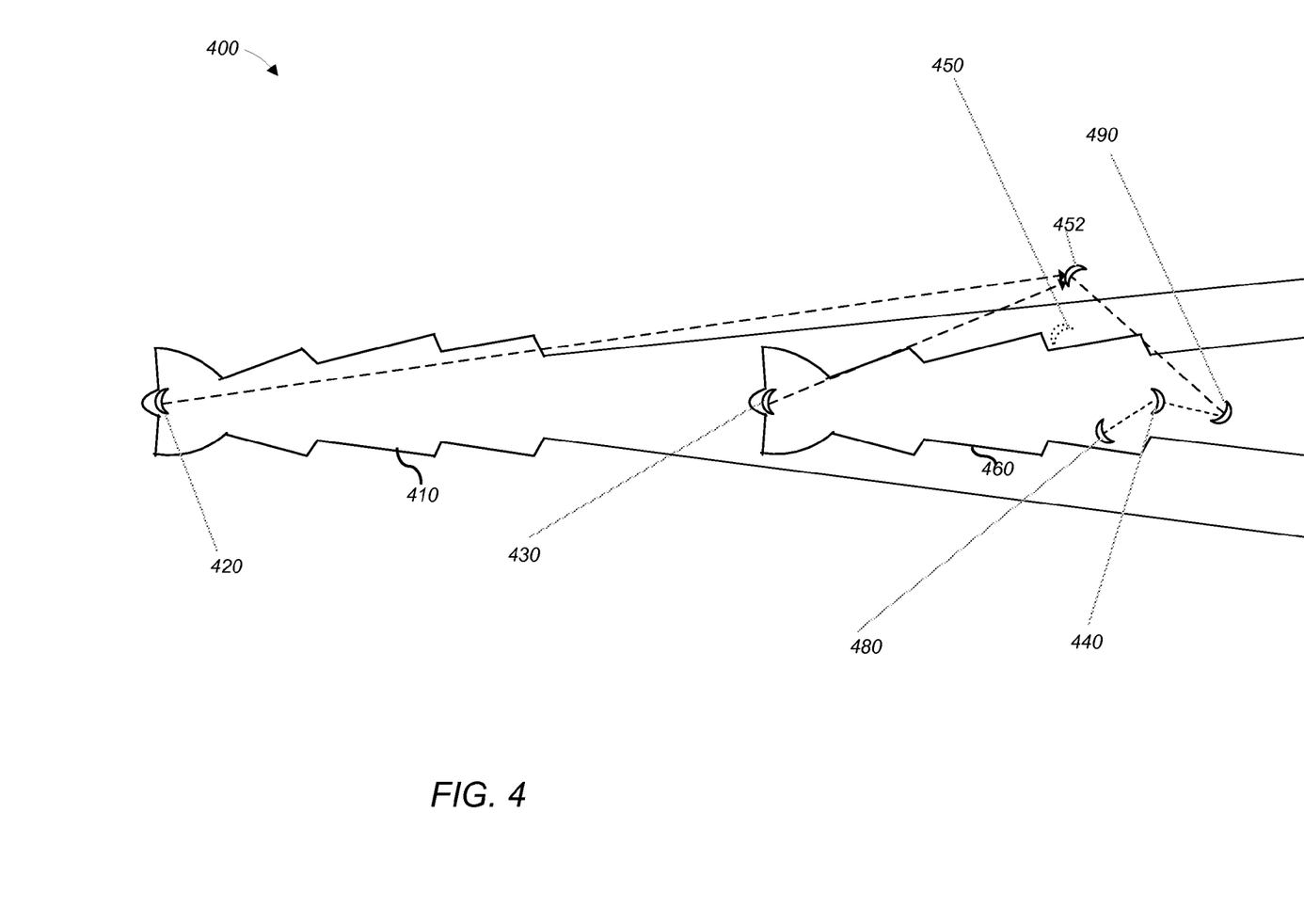
FIG. 4 illustrates another linear scale plot of an interference contour of a FDD primary site overlapping a pair of primary sites.

FIG. 4 illustrates another linear scale plot 400 of an interference contour 410 of a FDD primary site (e.g., Site C 420) overlapping a pair of primary sites (e.g., Site A 430 and Site B 440). In this example, only Site A 430 and Site C 420 are transmitting on the same frequency F1 as a secondary site (e.g., secondary site 480). Without Site C 420, a foreign receiver 450 receiving on frequency F1 could be located outside of the foreign receiver back lobe interference contour 460 of Site A 430 transmitting on frequency F1 with its main lobe pointed at a secondary site located between Sites A 430 and B 440 (e.g., secondary site 480). In particular, there would not be interference created by Site C 420 (e.g., as represented by interference contour 410), and the foreign receiver 450 located outside of the foreign receiver back lobe interference contour 460 of Site A 430 could receive harmful interference from, for example, the side lobe of the secondary site 480.

However, if Site C 420 is added and a primary path is coordinated from Site C 420 to Site B 440, then the foreign receiver back lobe interference contour 410 from Site C 420 in the direction of Site B 440, dominates beyond Site A 430. The harmful interference received at the back lobe of the foreign receiver 450 from Site C 420 forces the closest coordination location of the foreign receiver 450 away from the primary path (not shown) between Site A 430 and Site B 440.

The new coordination location of the foreign receiver 452 has forced its main lobe away from the secondary site 480 and beyond the area bounded by the interference contour 460. The foreign receiver side lobe interference contour (not shown) of Site A 430 may encompass the foreign receiver 452. Because the foreign receiver's 452 side lobe has more antenna gain than the back lobe, the foreign receiver side lobe interference contour covers a greater area than the back lobe coordination contour 460 of Site A 430. The interference received at the side lobe of the foreign receiver 452 may force the nearest coordination location of the foreign receiver to be farther removed from the primary path center line between Site A 430 and Site B 440. This relocation of the foreign receiver 452 causes the position of the closest foreign transmitter 490 to be beyond Site B 440. The foreign transmitter 490 would also need to be located beyond the point where interference from Site B 440 was received.

Because of the relocations, the foreign receiver's main lobe is not pointed at the primary path between Site A 430 and Site B 440. Therefore, the main lobe of the foreign receiver cannot be pointed at a secondary site located between Site A 430 and Site B 440.

By configuring Site C, an optimized area can be created for secondary sites transmitting on F1 between Site A 430 and Site B 440 within the interference contour of Site A 430 (e.g., foreign receiver back lobe interference contour 460). For example, secondary sites can operate on a plurality of paths around Site B 440 at angles between 90 degrees and 270 degrees around Site B 440.

In some implementations, Site C 420 can be configured at different locations. Site C 420 can be at different distances and angles relative to Site A 430 or Site B 440. For example, Site C 420 can be positioned on the opposite end of the path Site A 430 to Site B 440.

In some implementations, a plurality of primary sites are configured so that a plurality of coordinated paths overlap. For example, four or more primary sites can be configured so that their coordinated paths overlap. In addition, each primary site can have more than one path prior coordinated to one or more of the other primary sites.

Figure 5:
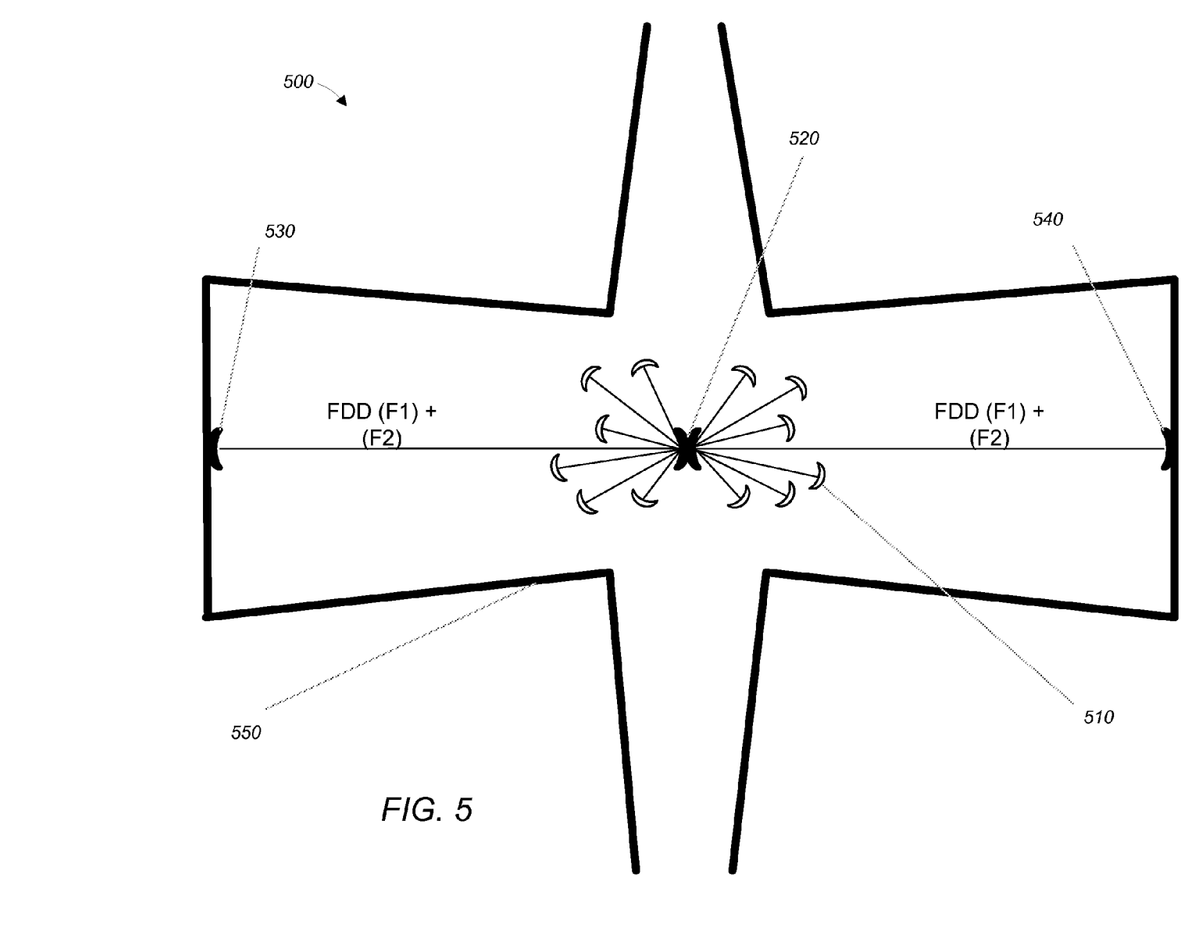
FIG. 5 illustrates a linear scale plot of secondary sites operating multiple paths at angles up to 360 degrees around a primary site.

FIG. 5 illustrates a linear scale plot 500 of secondary sites 510 operating multiple paths at angles up to 360 degrees around a primary site (e.g., Site B 520). A primary path is prior coordinated for Site A 530 transmitting to Site B 520 on frequency F1. A primary path is also prior coordinated for Site C 540 transmitting to Site B 520 on F1. This configuration creates an optimized area 550 for the secondary sites operating around Site B 520. In particular, with Site C 540 in the location represented in FIG. 5, secondary sites 510 can operate multiple paths 360 degrees around Site B 520.

Figure 6:
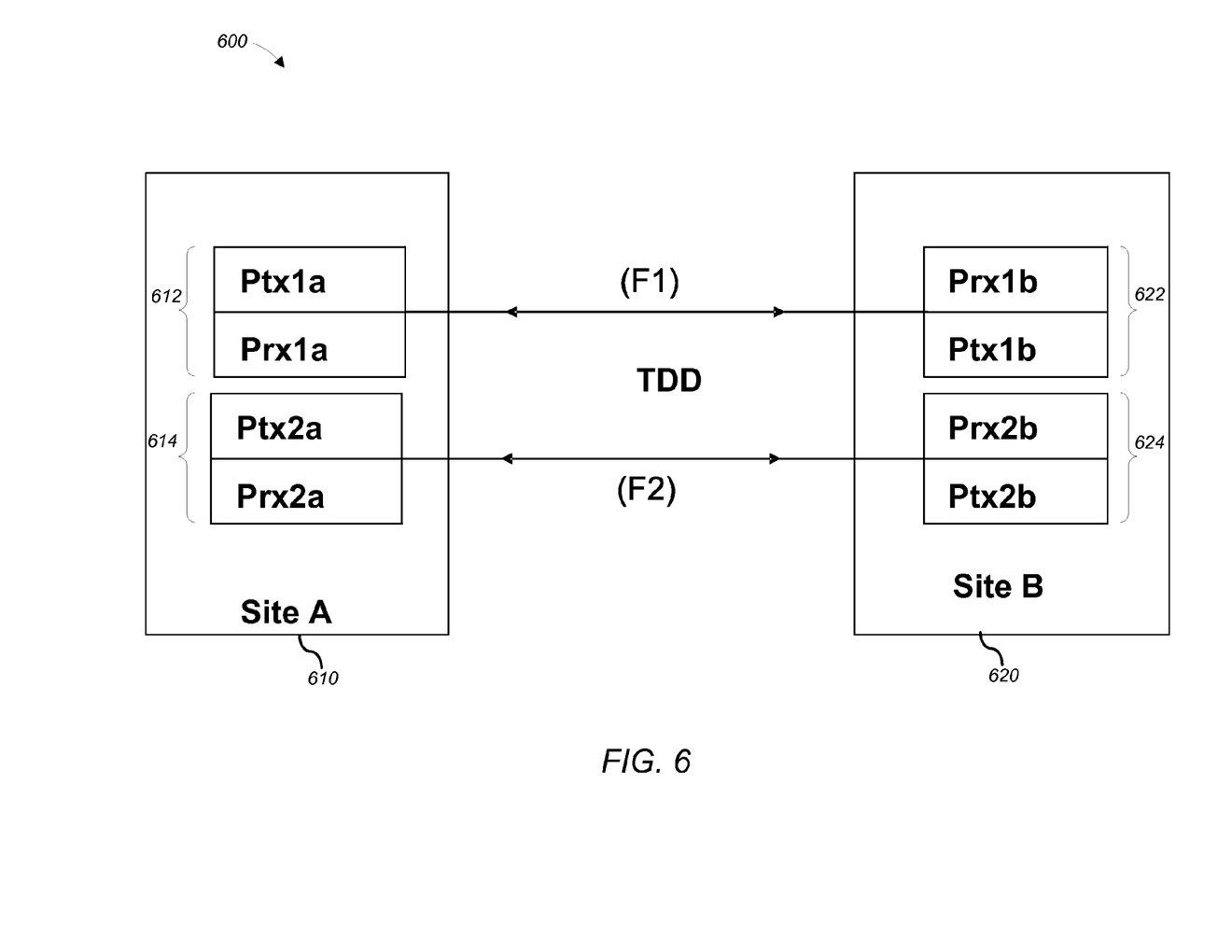
FIG. 6 is a block diagram illustrating a PTP system with two fixed sites operating on a coordinated microwave path with TDD FDD reversed paired frequencies.

FIG. 6 is a block diagram illustrating a PTP system 600 with two fixed sites (e.g., Site A 610 and Site B 620) operating on a coordinated microwave path with TDD-FDD reversed paired frequencies (e.g., frequencies F1 and F2). A PTP system 600 with two primary sites, Site A 610 and Site B 620, operating on a coordinated microwave path pair with TDD-FDD reversed paired frequencies is shown. Site A 610 includes a transceiver portion with two transceivers, 612 and 614. Site B 620 includes a transceiver portion with two transceivers, 622 and 624. The transmitter portion of transceiver 612 (Ptx1$a$) can transmit a signal to the receiver portion of transceiver 622 (Prx1$b$) on frequency F1 on a first coordinated microwave path. Similarly, the transmitter portion of transceiver 622 (Ptx1$b$) can also transmit a signal to the receiver portion of transceiver 612 (Prx1$a$) on frequency F1 on the first coordinated microwave path. However, only one of the two transceivers can transmit on frequency F1 at any given time. The same is true for transmissions between transceivers 614 and 624 on frequency F2 on a second coordinated microwave path. This PTP TDD-FDD reversed paired frequencies system allows a primary site to transmit at up to twice the data rate of a conventional PTP FDD system. This is because a primary site of the PTP TDD-FDD system can transmit on both frequencies simultaneously, whereas a site of a conventional PTP FDD system can only transmit on one of the two frequencies at a time.

In some implementations, a user can only prior coordinate one-way on a path between two primary sites (e.g., one way from Site A to Site B on frequency F1 and one way from Site B to Site A on frequency F2), restricting the mode of operation to FDD. Regardless of the mode of operation (e.g., FDD or TDD-FDD), similar methods can be used to create an optimized area, where the condition IFrxPte>IFrxSte is satisfied and within which a secondary site is unlikely to receive harmful interference from and will not cause harmful interference to foreign sites.

Figure 7:
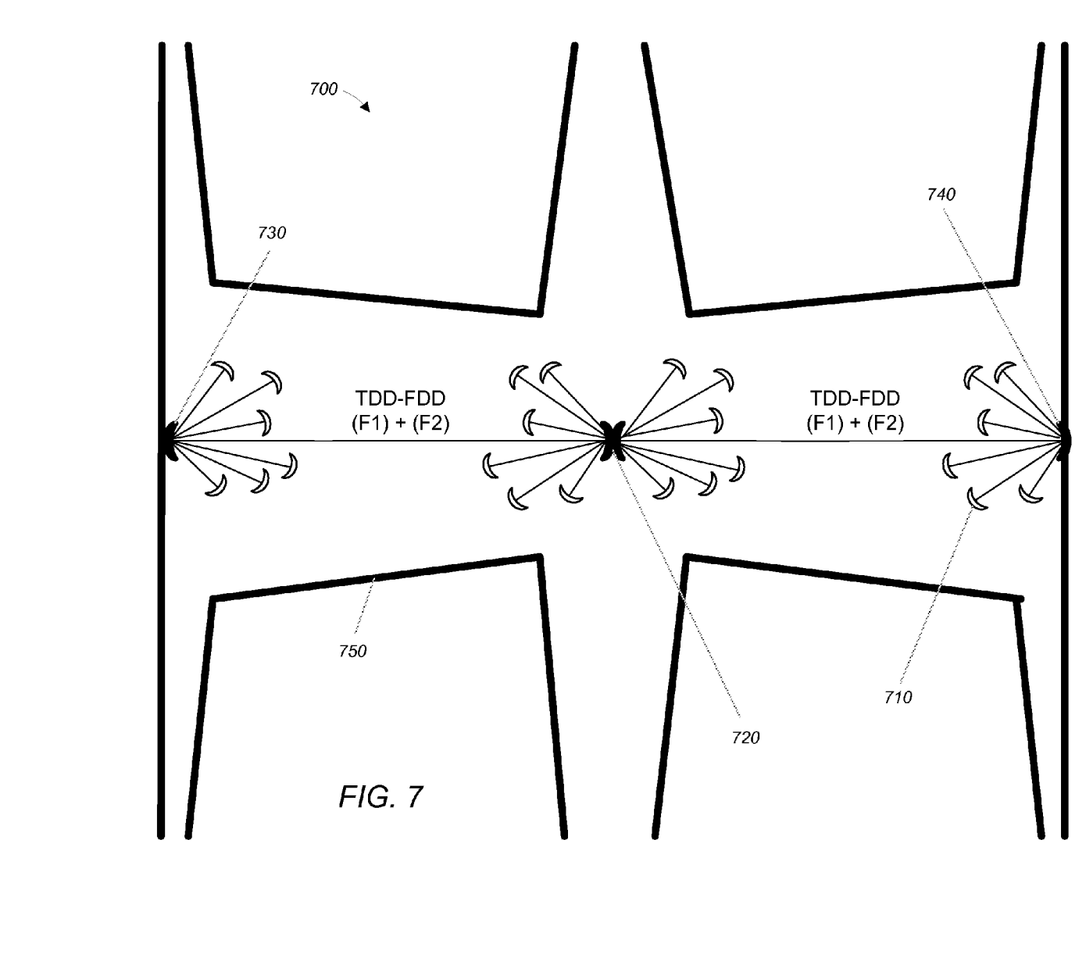
FIG. 7 illustrates a linear scale plot of secondary sites operating multiple paths at angles up to 360 degrees around a first primary site, and around second and third primary sites.

FIG. 7 illustrates a linear scale plot 700 of secondary sites 710 operating multiple paths at angles up to 360 degrees around a first primary site (e.g., Site B 720), and around second and third primary sites (e.g., Site A 730 and Site C 740). A primary path with TDD-FDD reversed paired frequencies (e.g., frequencies F1 and F2) is prior coordinated between Site A 730 and Site B 720. A primary path with TDD-FDD reversed paired frequencies (e.g., frequencies F1 and F2) is also prior coordinated between Site B 720 and Site C 740. This configuration creates an optimized area 750 for the secondary sites operating around Site A 730, Site B 720, and Site C 740. In particular, secondary sites 710 can operate on a plurality of paths around Site A 730 at angles between 0 and 90 degrees, and at angles between 270 to 360 degrees; around Site B 720 at angles up to 360 degrees around Site B 720; and around Site C 740 at angles between 90 and 270 degrees around Site C 740.

Operation of the PTMP system with TDD-FDD reversed paired frequencies allows the side lobe radiation of the primary site antenna to be used for transmission and reception on concurrently coordinated microwave paths. Conventionally, the side lobe radiation of the primary site antenna prohibited operation of another coordinated microwave path in the region of the side lobe. The ability to add concurrently coordinated microwave paths in these side lobe regions provides reuse of licensed frequencies without the need to conduct a coordination study to add a new coordinated microwave path.

Communication in TDD mode on each of the paired frequencies results in the capacity of the primary sites being shared among the secondary sites. The upload and download speeds on the paired frequencies can be adjusted to optimize traffic loading. Additionally, because the primary sites can transmit on both frequencies simultaneously, a primary site can burst data at nearly twice the speed of a conventional primary site operating in FDD mode.

In some implementations, the secondary sites can include additional wireless systems coupled to the transceivers that are configured to operate as access points for a personal area network (e.g., Bluetooth), a wireless local area network (e.g., the 802.11 standards, Wi-Fi), or a wireless metropolitan area network (e.g., the 802.16 standards, WiMAX). The transmission between primary and secondary sites is content neutral and operation is application neutral. The secondary site could be a mobile phone, a Blackberry, laptop or an access point and the content could be voice, data, or video. In some implementations, the secondary sites can operate as nodes in an ad-hoc or mesh network, where a secondary site can communicate directly with another secondary site in the same optimized area.

Spectrum use is technology neutral. Antenna types meeting regulatory requirements (e.g., 47 C.F.R. §101.115 for Category A or B antennas) can be deployed. In addition, because radiation from a secondary site antenna is less than the prior coordination of a related primary site and the secondary site antenna can be operated as part of a primary site antenna system, the secondary site antenna can be considered as an electrically integrated part of the primary site antenna system.

Figure 8:
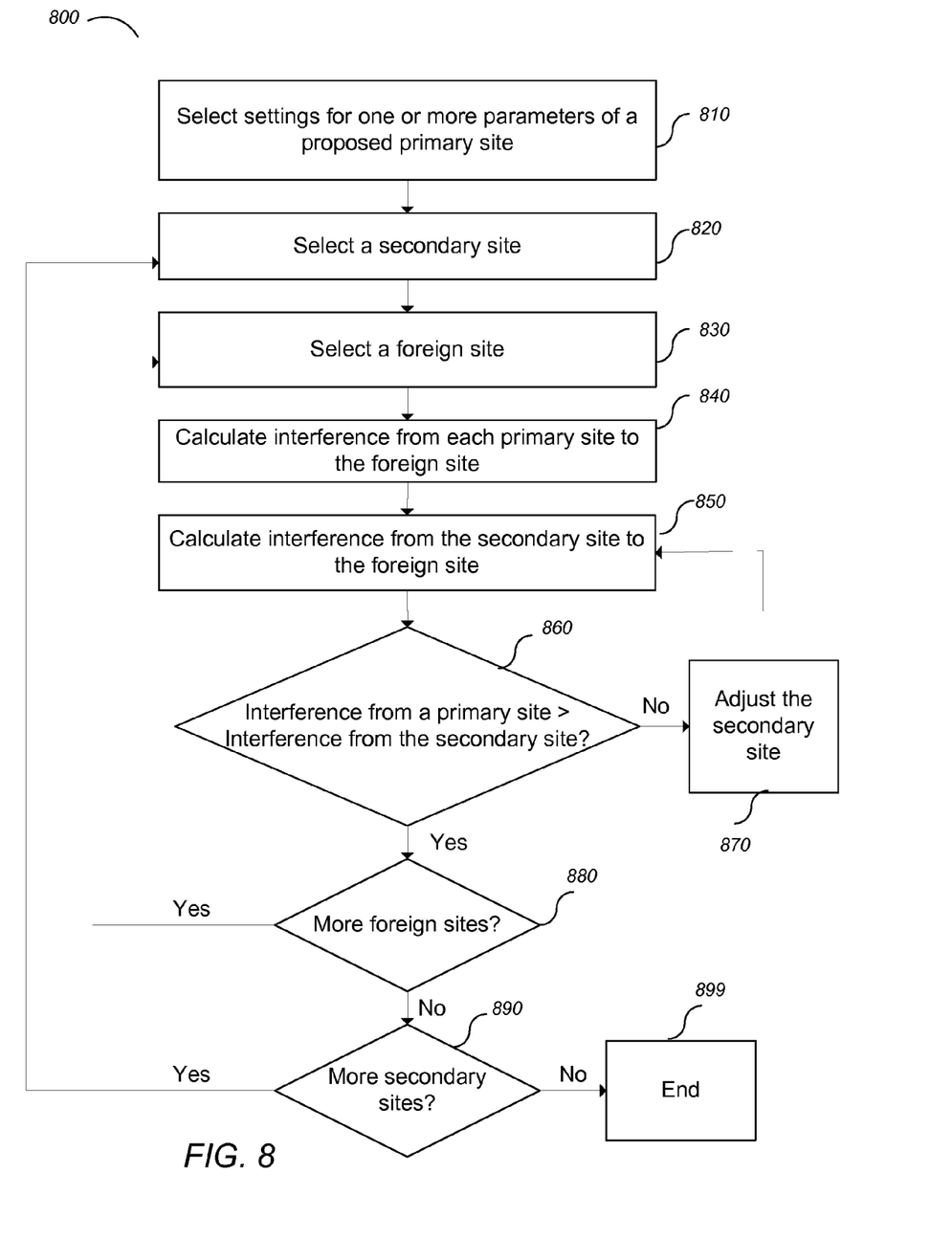
FIG. 8 illustrates a high level approximation of an example process for determining locations for secondary sites.

FIG. 8 illustrates a high level approximation of an example process 800 for determining locations for secondary sites. Determining locations for secondary sites includes selecting 810 settings for one or more parameters of a proposed primary site, including the antenna location, the antenna orientation, the transceiver power, and the antenna gain. The configuration of proposed primary sites can be determined through experimentation in the field, prior simulation or analysis, or some combination of these.

The configuration of proposed primary sites can be determined by placing the proposed primary site at a location and iteratively calculating interference levels (e.g., using Eqn. 1) and adjusting the settings for one or more parameters of the proposed primary site. A secondary site associated with the RPE of a primary site (e.g., one of the pair of primary sites or the proposed primary site) is selected 820. A foreign site is also selected 830. The foreign site can be an existing foreign site or a modeled foreign site.

The interference from each primary site to the foreign site is calculated 840. The interference from the secondary site to the foreign site is calculated 850. The interference from each primary site is compared to the interference from the secondary site. If the interference from a primary site is not greater than the interference from the secondary site ("No" branch of step 860), then the settings for one or more parameters of the secondary site are adjusted 870. The process returns to step 850. If the interference from a primary site is greater than the interference from the secondary site ("Yes" branch of step 860), then interference from other foreign sites can be compared. If there are more foreign sites to compare ("Yes" branch of step 880), then the process returns to step 830. If there are not more foreign sites ("No" branch of step 880), then interference from other secondary sites can be compared. If there are more secondary sites to compare ("Yes" branch of step 890), then the process returns to step 820. If there are not more secondary sites to compare ("No" branch of step 890), then the process ends (899). The proposed primary site can be fixed in the field and operated to create an optimized area for secondary sites, where the secondary sites will not cause harmful interference to foreign sites.

A number of embodiments of the invention have been described. Nevertheless, it will be understood that various modifications may be made without departing from the spirit and scope of the invention. For example, the methods discussed may be applicable to a system operating on a licensed microwave path or a system operating on an unlicensed or unregulated microwave path. A coordination study may have been conducted on the unlicensed or unregulated microwave path, or the operator of the system may otherwise have qualified for an exclusive use license of the microwave path. The primary sites may operate on coordinated paths on frequencies, e.g., radio frequencies, lower than microwave frequencies. Accordingly, other embodiments are within the scope of the following claims.

What is claimed is:

1. A system for operating a concurrently coordinated microwave path in a coordinated frequency pair, comprising:
a first base station at a first site, the first base station comprising a transceiver portion;
a second base station at a second site, the second base station comprising a transceiver portion, wherein the transceiver portion of the first base station and the transceiver portion of the second base station are configured to provide a first coordinated microwave path on a frequency pair from the first base station to the second base station using frequency division duplex (FDD) and to provide a second coordinated microwave path from the second base station to the first base station on the frequency pair using FDD such that a first frequency and a second frequency of the frequency pair operate with frequency division duplex-time division duplex (FDD-TDD) so as to cause co-channel interference;
a third base station at a third site, the third base station comprising a transceiver portion, wherein the transceiver portion of the second base station and the transceiver portion of the third base station are configured provide a third coordinated microwave path on the frequency pair from the third base station to the second base station using FDD and to provide a fourth coordinated microwave path from the second base station to the third base station on the frequency pair using FDD such that the first frequency and the second frequency of the frequency pair operate with frequency division duplex-time division duplex (FDD-TDD) so as to cause co-channel interference; and
a fourth site, the fourth site located in an optimized area defined by and including the union of a first coordination area of the first base station, a second coordination area of the second base station and a third coordination area of the third base station, the optimized area being subject to the co-channel interference created by transmitting from the first base station, the second base station and the third base station as a result of which no foreign transceiver can operate on a different coordinated microwave path on the first frequency or the second frequency in the optimized area without being subjected to or causing interference greater than a permissible level, the fourth site comprising a transceiver portion, the transceiver portion of the fourth site configured to transmit to a side lobe portion of the transceiver portion of the first site or the second site on a concurrently coordinated microwave path on the first frequency using time division multiplexing such that interference caused by the transceiver portion of the fourth site to other transceivers that operate on a different coordinated microwave path on the first frequency is less than interference caused by the transceiver portion of the third site to the other transceivers.

2. A method for operating a concurrently coordinated microwave path in a coordinated frequency pair, comprising:
in an optimized area defined by and including the union of a first coordination area of a first base station at a first site, a second coordination area of a second base station at a second site and a third coordination area of a third base station at a third site, the optimized area being subject to co-channel interference created by transmitting from the first base station to the second base station on a first coordinated microwave path and from the second base station to the first base station on a second coordinated microwave path using a frequency pair with frequency division duplex-time division duplex (FDD-TDD) and by transmitting from the third base station to the second base station on a third coordinated microwave path and from the second base station to the third base station using the frequency pair with frequency division duplex-time division duplex (FDD-TDD) as a result of which no foreign transceiver can operate on a different coordinated microwave path on a first frequency and a second frequency of the frequency pair in the optimized area without being subjected to or causing interference greater than a permissible level, transmitting on a concurrently coordinated microwave path from a transceiver portion of a fourth site to a side lobe portion of a transceiver portion of the first base station or the second base station on the first frequency using time division multiplexing such that interference caused by the transceiver portion of the fourth site to other transceivers that operate on a different coordinated microwave path on the first frequency is less than interference caused by the transceiver portion of the third site to the other transceivers.

3. A method for operating a concurrently coordinated microwave path in a coordinated frequency pair, comprising:
in an optimized area defined by and including the union of a first coordination area of a first base station at a first site, a second coordination area of a second base station at a second site and a third coordination area of a third base station at a third site, the optimized area being subject to co-channel interference created by transmitting from the first base station to the second base station on a first coordinated microwave path and from the second base station to the first base station on a second coordinated microwave path using a frequency pair with frequency division duplex-time division duplex (FDD-TDD) and by transmitting from the third base station to the second base station on a third coordinated microwave path and from the second base station to the third base station using the frequency pair with frequency division duplex-time division duplex (FDD-TDD) as a result of which no foreign transceiver can operate on a different coordinated microwave path on a first frequency and a second frequency of the frequency pair in the optimized area without being subjected to or causing interference greater than a permissible level, transmitting on a concurrently coordinated microwave path from a side lobe portion of a transceiver portion of the first base station or the second base station to a transceiver portion of a fourth site on the first frequency using time division multiplexing, such that interference caused by the transceiver portion of the fourth site to other transceivers that operate on a different coordinated microwave path on the first frequency is less than interference caused by the transceiver portion of the third site to the other transceivers.

4. A method comprising:
for an optimized area, a transceiver portion of a first site configured to transmit on a concurrently coordinated microwave path to a second site or a third site on a first frequency, the second site comprising a transceiver portion, a transceiver portion of the third site configured to receive from the transceiver portion of the second site on a coordinated microwave path on the first frequency;
determining a configuration for a fourth site, where interference caused by the first site to other transceivers that operate on a different coordinated microwave path on the first frequency is less than interference caused by the fourth site to the other transceivers;

where determining a configuration for the fourth site includes:
selecting settings for one or more parameters of the fourth site, the parameters including the location for an antenna, the orientation of the antenna, the gain of the antenna, or the power of the transceiver portion;
estimating the interference from the transceiver portion of the fourth site to a transceiver portion of one or more sites that operate on a different coordinated microwave path on the first frequency; and
estimating the interference from the transceiver portion of the first site to the transceiver portion of the one or more sites.

5. The method of claim 4, where the one or more sites are existing sites.

6. The method of claim 4, where the one or more sites are modeled future sites.

7. The method of claim 4, where the interference is calculated according to the expression: TrxEIRP+AFrx−96.6−20 log(Fo)−20 log(D), where:
TrxEIRP=Equivalent Isotropic Radiated Power of the transceiver portion of a site in dBm;
AFrx=antenna gain of another site that operates on a different coordinated microwave path at an angle directly towards the transceiver portion of the site in dBi;
Fo=frequency of operation in GHz; and
D=distance, in miles, between the sites.

8. An auxiliary station comprising:
a transceiver portion located in an optimized area defined by and including the union of a first coordination area of a first base station at a first site, a second coordination area of a second base station at a second site and a third coordination area of a third base station at a third site, the optimized area being subject to co-channel interference created by transmitting from the first base station to the second base station on a first coordinated microwave path and from the second base station to the first base station on a second coordinated microwave path using a frequency pair with frequency division duplex-time division duplex (FDD-TDD) and by transmitting from the third base station to the second base station on a third coordinated microwave path and from the second base station to the third base station using the frequency pair with frequency division duplex-time division duplex (FDD-TDD) as a result of which no foreign transceiver can operate on a different coordinated microwave path on a first frequency and a second frequency of the frequency pair in the optimized area without being subjected to or causing interference greater than a permissible level, the transceiver portion located at a fourth site in the optimized area and configured to transmit and receive from a side lobe portion of a transceiver portion of the first base station or the second base station on a concurrently coordinated microwave path on a first frequency using time division multiplexing, such that interference caused by the transceiver portion at the fourth site to other transceivers that operate on a different coordinated microwave path on the first frequency is less than interference caused by the third site to the other transceivers.

9. A first base station comprising:
a transceiver portion at a first site having a side lobe portion configured to transmit to and receive from a transceiver portion of a second base station at a second site on a concurrently coordinated microwave path on a frequency pair with frequency division duplex-time division duplex (FDD-TDD), the transceiver portion of the first site further configured to transmit to and receive from a transceiver portion of a fourth site on a concurrently coordinated microwave path on the first frequency using time division multiplexing, the fourth site located in an optimized area defined by and including the union of a first coordination area of the first base station at the first site, the second coordination area of the second base station at the second site and a third coordination area of a third base station at a third site, the optimized area being subject to co-channel interference created by transmitting from the first base station to the second base station on a first coordinated microwave path and from the second base station to the first base station on a second coordinated microwave path using the frequency pair with frequency division duplex-time division duplex (FDD-TDD) and by transmitting from the third base station to the second base station on a third coordinated microwave path and from the second base station to the third base station using the frequency pair with frequency division duplex-time division duplex (FDD-TDD) as a result of which no foreign transceiver can operate on a different coordinated microwave path on a first frequency and a second frequency of the frequency pair in the optimized area without being subjected to or causing interference greater than a permissible level, where interference caused by the fourth site to other transceivers that operate on a different coordinated microwave path on the first frequency is less than interference caused by the third site to the other transceivers.

\* \* \* \* \*

UNITED STATES PATENT AND TRADEMARK OFFICE
CERTIFICATE OF CORRECTION

PATENT NO. : 8,078,109 B1  
APPLICATION NO. : 12/102766  
DATED : December 13, 2011  
INVENTOR(S) : Mulcay Page 1 of 1

It is certified that error appears in the above-identified patent and that said Letters Patent is hereby corrected as shown below:

Title Page Item (73) (Assignee), Column 1, Line 1, delete "Stategies," and insert -- Strategies, --, therefor.

Column 13, Line 22, after "configured" insert -- to --.

Signed and Sealed this  
Sixth Day of March, 2012

David J. Kappos  
*Director of the United States Patent and Trademark Office*